United States Patent
Dall Acqua et al.

(10) Patent No.: US 12,429,834 B2
(45) Date of Patent: Sep. 30, 2025

(54) APPARATUS, SYSTEM AND METHOD FOR THE REMOTE CONTROL OF A HOUSEHOLD APPLIANCE

(71) Applicant: BSH Hausgeraete GmbH, Munich (DE)

(72) Inventors: Daniele Dall Acqua, Munich (DE); Tobias Goldschalt, Waging am See (DE); Adam Wypior, Burglengenfeld (DE)

(73) Assignee: BSH Hausgeräte GmbH, Munich (DE)

( * ) Notice: Subject to any disclaimer, the term of this patent is extended or adjusted under 35 U.S.C. 154(b) by 386 days.

(21) Appl. No.: 17/571,717

(22) Filed: Jan. 10, 2022

(65) Prior Publication Data
US 2022/0229405 A1 Jul. 21, 2022

(30) Foreign Application Priority Data
Jan. 21, 2021 (DE) .......................... 102021200513.6

(51) Int. Cl.
*G05B 15/02* (2006.01)
(52) U.S. Cl.
CPC .................... *G05B 15/02* (2013.01)
(58) Field of Classification Search
CPC .............. G05B 15/02; G05B 19/418; G05B 2219/2642; G08C 2201/91; G08C 2201/93; G08C 17/02; H04L 12/2816; H04W 4/021; H04W 4/025; H04W 4/33; H04W 4/80
See application file for complete search history.

(56) References Cited

U.S. PATENT DOCUMENTS

| | | | |
|---|---|---|---|
| 9,584,773 B2 | 2/2017 | Chien et al. | |
| 9,668,327 B2 | 5/2017 | Dobai et al. | |
| 2007/0293190 A1 | 12/2007 | Ota | |
| 2014/0195063 A1* | 7/2014 | Wu | H04L 12/2818 700/295 |
| 2015/0180880 A1 | 6/2015 | Nakano et al. | |
| 2017/0162036 A1 | 6/2017 | Agardh et al. | |
| 2020/0110532 A1* | 4/2020 | Mani | H04N 23/611 |

FOREIGN PATENT DOCUMENTS

| | | | | |
|---|---|---|---|---|
| CN | 104954733 A | 9/2015 | | |
| CN | 105493635 A | 4/2016 | | |
| CN | 106130852 A | 11/2016 | | |
| CN | 108536112 A | 9/2018 | | |
| CN | 109738862 A | 5/2019 | | |
| DE | 102014007177 A1 * | 11/2015 | ............. | G08C 17/00 |

OTHER PUBLICATIONS

English translation of DE 102014007177.*
English translation of Foreign publication (Year: 2015).*

* cited by examiner

*Primary Examiner* — Mohammad Ali
*Assistant Examiner* — Sheela Rao
(74) *Attorney, Agent, or Firm* — Laurence A. Greenberg; Werner H. Stemer; Ralph E. Locher

(57) ABSTRACT

An apparatus for the remote control of a household appliance is configured to receive a remote-control instruction for the remote control of a household appliance from a mobile control device. The apparatus is configured to determine a position of the control device relative to the household appliance by using an indoor positioning system. The apparatus is further configured to implement or not implement the remote-control instruction as a function of the determined position of the control device. A system and a method for the remote control of a household appliance are also provided.

11 Claims, 2 Drawing Sheets

APPARATUS, SYSTEM AND METHOD FOR THE REMOTE CONTROL OF A HOUSEHOLD APPLIANCE

CROSS-REFERENCE TO RELATED APPLICATION

This application claims the priority, under 35 U.S.C. § 119, of German Patent Application DE 10 2021 200 513.6, filed Jan. 21, 2021; the prior application is herewith incorporated by reference in its entirety.

FIELD AND BACKGROUND OF THE INVENTION

The invention relates to an apparatus, a system and a corresponding method for the safe remote control of a household appliance.

A household appliance such as a dishwasher, a washing machine, a cooker or cooktop, a coffee machine, an oven, a dryer, etc. can be embodied to be controlled remotely by using a remote-control device, for example by using a smartphone.

SUMMARY OF THE INVENTION

It is accordingly an object of the invention to provide an apparatus, a system and a method for the remote control of a household appliance, which overcome the hereinafore-mentioned disadvantages of the heretofore-known apparatuses, systems and methods of this general type and which enable a particularly safe and convenient remote control of a household appliance in an efficient manner.

With the foregoing and other objects in view there is provided, in accordance with the invention, an apparatus for the remote control of a household appliance, the apparatus being configured to receive a remote-control instruction for the remote control of a household appliance from a mobile control device, to determine a position of the control device relative to the household appliance using an indoor positioning system, and to implement or not implement the remote-control instruction as a function of the determined position of the control device.

According to one aspect of the invention, an apparatus for the remote control of a household appliance such as a dishwasher, a washing machine, a dryer, an oven, a cooker or cooktop, etc. is provided. The household appliance can be disposed in a household with one or several different rooms. In the household, an indoor positioning system can be installed that enables a control device (such as a smartphone) to be localized within the household. In this case, the indoor positioning system can enable a localization on the basis of one or several radio technologies, such as for example Bluetooth Low Energy (BTLE), Ultra-Wideband (UWB) and/or RFID (Radio Frequency ID). The apparatus can be disposed outside of the household appliance. In an alternative example, the apparatus is part of the household appliance.

The apparatus is configured to receive a remote-control instruction for the remote control of a household appliance from a mobile control device (for example from a smartphone with an app for controlling the household appliance). The remote-control instruction can be intended to start the household appliance or an operating program of the household appliance. The remote-control instruction can be transmitted through a radio network (for example through WLAN) from the control device to the apparatus (possibly through one or several network nodes such as routers, for example).

The apparatus can further be configured to determine the position of the control device relative to the household appliance by using the indoor positioning system (of the household in which the household appliance is located). In particular, it is possible to determine how the control device is disposed relative to the household appliance (for example at what distance and/or in what direction the control device is disposed relative to the position of the household appliance).

Furthermore, the apparatus is configured to implement or not implement the remote-control instruction as a function of the determined position of the control device. The apparatus can be configured in particular, as a function of the determined position of the control device, to forward the remote-control instruction to the household appliance (in order to cause the remote-control instruction to be implemented) or to prevent the remote-control instruction from being forwarded to the household appliance (in order to cause the remote-control instruction not to be implemented).

A particularly efficient, safe and convenient remote control of a household appliance can be enabled by the localization of a mobile control device by using an indoor positioning system.

The apparatus can be configured, in particular as a reaction to the receipt of the remote-control instruction and/or independently of the receipt of a remote-control instruction, to send a request regarding the position of the control device to a positioning unit of the indoor positioning system. A response regarding the position of the control device can then be received from the positioning unit of the indoor positioning system. The position of the mobile control device can be determined in a particularly efficient and reliable manner through the use of a (separate) positioning unit.

The apparatus can be configured to establish, on the basis of the determined position of the control device, whether or not a line of sight is possible from the position of the control device (for a user of the control device) to the household appliance for the purpose of monitoring the household appliance. As already described above, the remote-controlled household appliance can be disposed in a household with one or several rooms. The indoor positioning system can be embodied to determine the position of the control device within the household. In particular, the indoor positioning system can be configured to determine in which room and/or at what point in a room the mobile control device is located.

The apparatus can be configured to establish, on the basis of digital mapping data regarding the spatial arrangement of the one or several rooms of the household, whether or not a line of sight is possible from the position of the control device (for a user of the control device) to the household appliance for the purpose of monitoring the household appliance. By considering digital mapping data regarding the geometry of the household in which the remote-controlled household appliance is located, it is possible to determine in a particularly precise manner whether or not a line of sight is possible from the position of the control device (for a user of the control device) to the household appliance for the purpose of monitoring the household appliance.

The apparatus can further be configured to cause the remote-control instruction to be implemented by the household appliance if it is established that a line of sight is possible from the position of the control device to the household appliance. In this case, the apparatus can be configured to cause the remote-control instruction to be implemented by the household appliance without the need for the user to confirm the remote-control instruction on a (local) operating element of the household appliance (on a button of the household appliance, for example). In this way, a particularly safe and convenient remote-controlled operation of the household appliance can be enabled.

On the other hand, the apparatus can be configured to prevent the remote-control instruction from being implemented by the household appliance if it is established that no line of sight is possible from the position of the control device to the household appliance. The apparatus can further be configured to send a response to the control device to the effect that the remote-control instruction will not be implemented by the household appliance if the apparatus prevents the remote-control instruction from being implemented. In this way, an impermissible remote control of the household appliance can be prevented in a convenient manner.

With the objects of the invention in view, there is also provided a system for the remote control of a household appliance. The system includes an indoor positioning system, which is configured to determine the position of a mobile control device for the remote control of a first household appliance relative to the first household appliance. The system further includes an apparatus according to the invention for the remote control of the first household appliance as a function of the position of the control device determined by the indoor positioning system.

The indoor positioning system can include one or several household appliances (for example one or several appliances in a household and/or one or several appliances outside of a household, for example in a building or in a hall), which, as fixed anchor nodes of the indoor positioning system, are configured in each case to determine position data regarding the position of the control device relative to the respective household appliance. In this case, the position data of a household appliance can include information regarding a radio connection, in particular regarding the signal strength and/or regarding the distance of a radio connection (such as a BTLE or a UWB radio connection), between the control device and the household appliance.

Furthermore, the indoor positioning system can include a positioning unit which is configured to determine the position of the control device relative to the first household appliance on the basis of the position data of the one or several household appliances (using a triangulation method, for example). The one or several (remote-controlled) household appliances of a household can thus be used in a particularly efficient manner to determine the position of the mobile control device.

In one example, the system includes the first household appliance. The apparatus according to the invention can be provided in a particularly efficient manner as part of the first household appliance, for example as part of a control unit of the first household appliance. Alternatively, the apparatus can be disposed in a flexible manner outside of the first household appliance.

With the objects of the invention in view, there is concomitantly provided a method for the remote control of a household appliance. The method includes receiving a remote-control instruction for the remote control of a household appliance from a mobile control device. Furthermore, the method includes determining a position of the control device relative to the household appliance using an indoor positioning system. The method further includes implementing or preventing the remote-control instruction as a function of the determined position of the control device.

It should be noted that each aspect of the method described in this document and the apparatus described in this document can be combined with one another in a variety of ways. In particular, the features of the claims can be combined with one another in a variety of ways.

Other features which are considered as characteristic for the invention are set forth in the appended claims.

Although the invention is illustrated and described herein as embodied in an apparatus, a system and a method for the remote control of a household appliance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
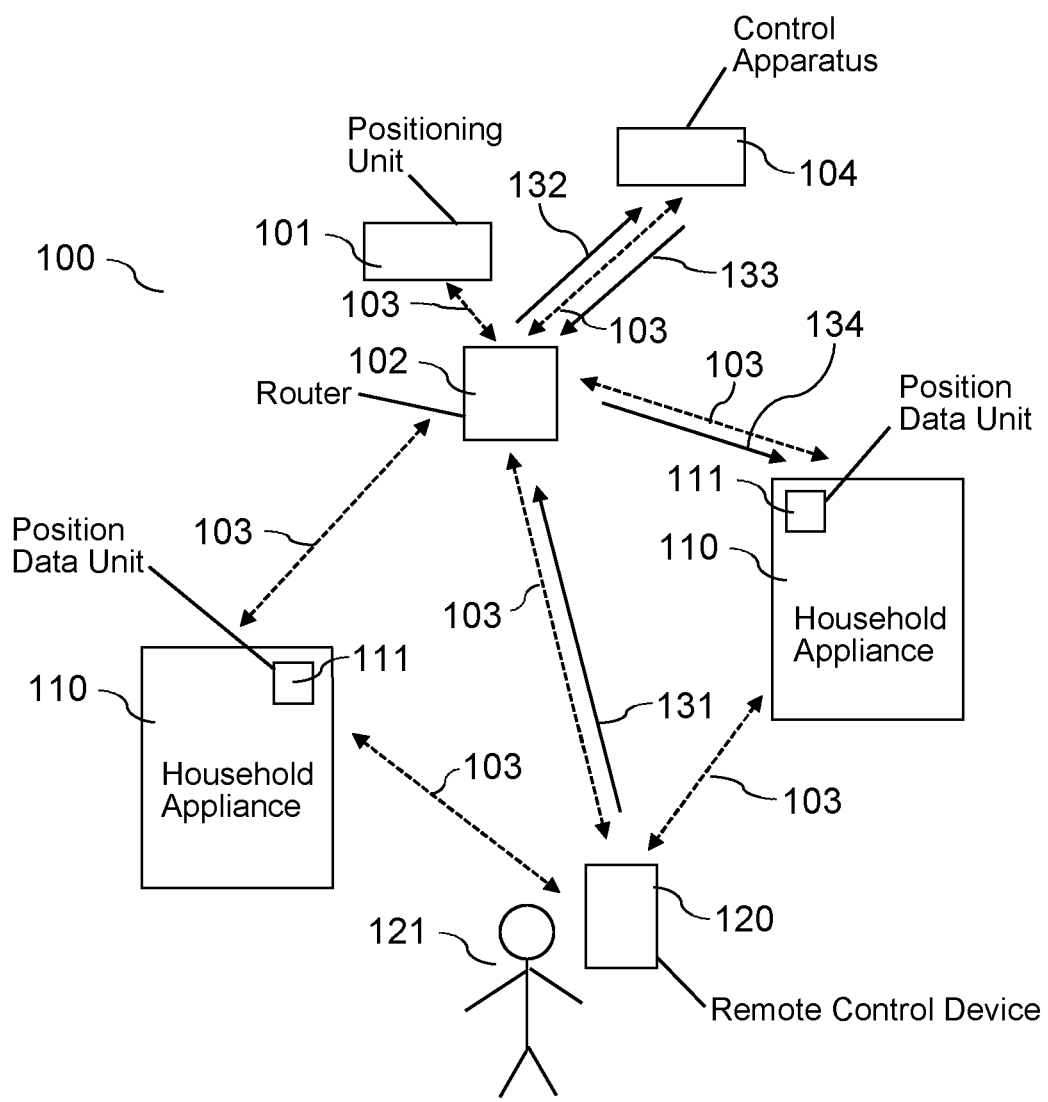
FIG. 1 is a block diagram of a system for the remote control of a household appliance.

As described in the introduction, the present disclosure is concerned with the efficient, reliable, convenient and safe remote control of a household appliance. Referring now to the figures of the drawings in detail and first, particularly, to FIG. 1 thereof, there is seen an exemplary system 100 for the remote control of a household appliance 110. The system 100 can include several different household appliances 110, which are disposed at different points in a household, for example in the kitchen, in the bathroom, in a washroom, etc. A user 121 of one or several household appliances 110 can carry a remote control device 120, such as a smartphone, which enables the user 121 to control the one or several household appliances 110 remotely. To this end, the control device 120 can be embodied to send a control instruction for controlling a specific household appliance 110 through a (wireless) communication connection 103 to the specific household appliance 110.

In order to provide for a safe remote control of a household appliance 110, in particular for a safe operation, for example for a safe start, of a household appliance 110 by using a remote control device 120, it can be necessary for the user 121 to be located close to the remote-controlled household appliance 110 in such a way that the user 121 can monitor the operation of the household appliance 110 during the remote control. The system 100 can be embodied to determine the position of the user 121, in particular the position of the control device 120, relative to the remote-controlled household appliance 110. In this case, the position of the control device 120 can be determined by using an indoor positioning system of the household.

Some or all of the household appliances 110 can be embodied to serve as fixed anchor nodes in the indoor positioning system and therefore the household appliances 110 represent parts of the indoor positioning system. In particular, a household appliance 110 can have a position data unit 111, which is embodied to determine position data regarding the position of the control device 120 relative to the respective household appliance 110. The position data can be determined for example on the basis of a (wireless) communication connection 103 between the control device 120 and the respective household appliance 110, for example on the basis of a Bluetooth Low Energy (BTLE), on the basis of an Ultra-Wideband (UWB) and/or on the basis of an RFID (Radio Frequency ID) connection. The position data can indicate for example the signal strength and/or the distance or length of the communication connection 103 between the control device 120 and the respective household appliance 110.

The position data of different anchor nodes, in particular of different position data units 111, can be sent through a router 102 of the system 100 to a positioning unit 101 of the indoor positioning unit, which is configured to determine the position of the control device 120 relative to at least one household appliance 110 to be controlled remotely on the basis of the position data of several position data units 111. The determined position can be taken into consideration in the remote control of the household appliance 110.

The system 100 can include a control apparatus 104, which is configured to monitor the remote control of a household appliance 110 of the system 100. A control instruction 131 issued by the control device 120 of the user 121 can be forwarded through the router 102 to the control apparatus 104 (message 132). The control apparatus 104 can thereupon check the position, determined by the positioning unit 101 of the system 100, of the control device 120 relative to the household appliance 110 to be controlled remotely.

The remote control of the household appliance 110 can be enabled or prevented as a function of the position of the control device 120 determined by using the indoor positioning system. In particular, the control apparatus 104 can be embodied to forward the control instruction 131 to the household appliance 110 (messages 133, 134) if it is established on the basis of the determined position of the control device 120 that the user 121 is located in the immediate vicinity of the household appliance 110 (and can thus monitor the remote control of the household appliance 110). On the other hand, a forwarding of the control instruction 131 to the household appliance 110 can be prevented if it is established on the basis of the determined position of the control device 120 that the user 121 is not located in the immediate vicinity of the household appliance 110 (and thus cannot monitor the remote control of the household appliance 110).

If the control apparatus 104 is part of the household appliance 110, the control apparatus 104 can be embodied to enable or prevent the execution of the control instruction 131 (received at the household appliance 110) as a function of the position of the control device 120 determined by using the indoor positioning system.

In this way, a safe and convenient remote control of a household appliance 110 can be enabled, in particular without the user 121 having to confirm the remote control manually directly on the household appliance 110.

Figure 2:
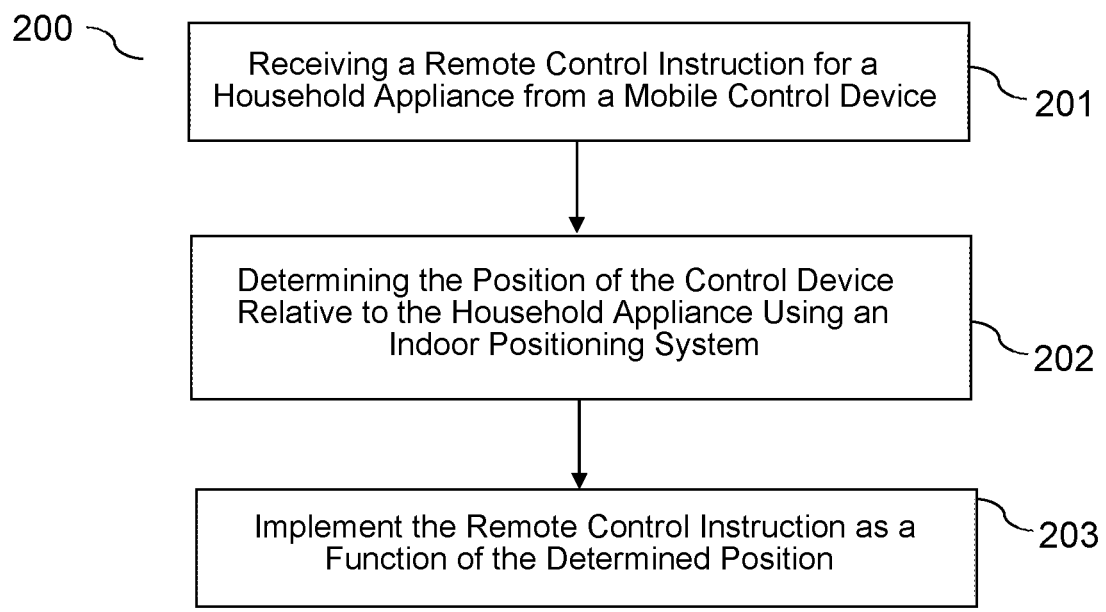
FIG. 2 is a flow chart of an exemplary method for the remote control of a household appliance.

FIG. 2 shows a flow chart of an exemplary (possibly computer-implemented) method 200 for the remote control of a household appliance 110. The method 200 can be carried out by a control unit of a or the household appliance 110 and/or by a control apparatus 104 of a household (for example by a (smart home) server).

The method 200 includes receiving 201 a remote-control instruction 131 for the remote control of a household appliance 110 from a mobile control device 120 (such as a smartphone). The remote-control instruction 131 (sent from the control device 120) can be received over a wireless communication network at the control apparatus 104 and/or at the control unit of the household appliance 110.

The method 200 further includes determining 202 a position of the control device 120 relative to the household appliance 110 by using an indoor positioning system. The indoor positioning system can be embodied to determine the position of the control device 120 within the (entire) household in which the household appliance 110 to be controlled remotely is disposed. In this case, one or several household appliances 110 (such as a washing machine, a dishwasher, an oven, a refrigerator, a cooker or cooktop, a coffee machine, a freezer, etc.) can advantageously serve as fixed anchor nodes of the indoor positioning system.

Furthermore, the method 200 includes implementing or preventing 203 the remote-control instruction 131 as a function of the determined position of the control device 120. The implementation of the remote-control instruction 131 can take place for example if it is established on the basis of the position that the control device 120 is located in the immediate proximity of the household appliance 110. On the other hand, the implementation of the remote-control instruction 131 can be prevented. In this way, a safe remote control of a household appliance 110 can be enabled in an efficient, convenient and reliable manner.

The present invention is not restricted to the exemplary embodiments shown. In particular, it should be noted that the description and the figures are only intended to illustrate the principle of the proposed method and/or the proposed apparatus.

The invention claimed is:

1. An apparatus for remotely controlling a household appliance, the apparatus configured:
    to receive a remote-control instruction for the remote control of a household appliance from a mobile control device;
    to determine a position of the mobile control device relative to the household appliance using an indoor positioning system;
    to establish, based on the determined position of the mobile control device, whether or not a line of sight is possible from the position of the mobile control device to the household appliance for monitoring the household appliance;
    in dependence on the determined position of the mobile control device:
        to forward the remote-control instruction to the household appliance to cause the remote-control instruction to be implemented, or
        to prevent the remote-control instruction from being forwarded to the household appliance to cause the remote-control instruction not to be implemented; and
    to at least one of:
    cause the remote-control instruction to be implemented by the household appliance upon establishing that a line of sight is possible from the position of the mobile control device to the household appliance, or
    prevent the remote-control instruction from being implemented by the household appliance upon establishing that no line of sight is possible from the position of the mobile control device to the household appliance.

2. The apparatus according to claim 1, wherein the apparatus is configured:

as a reaction to receiving the remote-control instruction, to send a request regarding the position of the mobile control device to a positioning unit of the indoor positioning system; and to receive a response regarding the position of the mobile control device from the positioning unit of the indoor positioning system.

3. The apparatus according to claim 1, wherein:

the household appliance is disposed in a household with one or several rooms;

the indoor positioning system is configured to determine the position of the mobile control device within the household; and the apparatus is configured to establish, based on digital mapping data regarding a spatial arrangement of the one or several rooms of the household, whether or not a line of sight is possible from the position of the mobile control device to the household appliance for monitoring the household appliance.

4. The apparatus according to claim 3, wherein the remote-control instruction is configured to start the household appliance or an operating program of the household appliance.

5. The apparatus according to claim 3, wherein the apparatus is configured to cause the remote-control instruction to be implemented by the household appliance without a need for a user to confirm the remote-control instruction on an operating element of the household appliance.

6. The apparatus according to claim 1, wherein the apparatus is configured to send a response to the mobile control device causing the remote-control instruction to not be implemented by the household appliance upon the apparatus preventing the remote-control instruction from being implemented.

7. A system for remotely controlling a household appliance, the system comprising:

an indoor positioning system configured to determine a position of a mobile control device for remotely controlling a first household appliance; and an apparatus according to claim 1 for remotely controlling the first household appliance as a function of the position of the mobile control device determined by the indoor positioning system.

8. The system according to claim 7, wherein the indoor positioning system includes:

one or several household appliances acting as fixed anchor nodes of the indoor positioning system, the fixed anchor nodes each being configured to determine position data regarding a position of the mobile control device relative to a respective one of the one or several household appliances; and a positioning unit configured to determine the position of the mobile control device relative to the first household appliance based on the position data of the one or several household appliances.

9. The system according to claim 7, wherein the position data of a household appliance includes information relating to a radio connection or relating to at least one of a signal strength or a distance of a radio connection between the mobile control device and the household appliance.

10. The system according to claim 7, wherein the apparatus for remotely controlling the first household appliance is disposed outside of the first household appliance:

an indoor positioning system configured to determine a position of a mobile control device for remotely controlling a first household appliance; and an apparatus according to claim 1 for remotely controlling the first household appliance as a function of the position of the mobile control device determined by the indoor positioning system.

11. A method for remotely controlling a household appliance, the method comprising:

receiving a remote-control instruction for remotely controlling a household appliance from a mobile control device;

determining a position of the mobile control device relative to the household appliance using an indoor positioning system; and establishing, based on the determined position of the mobile control device, whether or not a line of sight is possible from the position of the mobile control device to the household appliance for monitoring the household appliance;

in dependence on the determined position of the mobile control device:

forwarding the remote-control instruction to the household appliance to cause the remote-control instruction to be implemented, or preventing the remote-control instruction from being forwarded to the household appliance to cause the remote-control instruction not to be implemented; and at least one of:

causing the remote-control instruction to be implemented by the household appliance upon establishing that a line of sight is possible from the position of the mobile control device to the household appliance, or preventing the remote-control instruction from being implemented by the household appliance upon establishing that no line of sight is possible from the position of the mobile control device to the household appliance.

* * * * *